MICROWAVE CARRIER TELEPHONE SYSTEM

Filed Feb. 21, 1948 3 Sheets-Sheet 1

INVENTOR
S. D. ROBERTSON
BY N. S. Ewing
ATTORNEY

MICROWAVE CARRIER TELEPHONE SYSTEM

Filed Feb. 21, 1948 3 Sheets-Sheet 2

INVENTOR
S. D. ROBERTSON
BY N. A. Ewing
ATTORNEY

Aug. 18, 1953 S. D. ROBERTSON 2,649,539

MICROWAVE CARRIER TELEPHONE SYSTEM

Filed Feb. 21, 1948 3 Sheets-Sheet 3

INVENTOR
S. D. ROBERTSON
BY N. S. Ewing
ATTORNEY

Patented Aug. 18, 1953

2,649,539

UNITED STATES PATENT OFFICE 2,649,539

MICROWAVE CARRIER TELEPHONE SYSTEM

Sloan D. Robertson, Red Bank, N. J., assignor to Bell Telephone Laboratories, Incorporated, New York, N. Y., a corporation of New York Application February 21, 1948, Serial No. 10,023

17 Claims. (Cl. 250—6)

This invention relates in general to the transmission and reception of radio waves, and more particularly to radio carrier signaling systems.

In accordance with certain prior art systems, such as disclosed in Patent 1,771,148 to C. A. Sprague, July 22, 1930, the wire circuits used in conventional telephone systems to conduct electrical message currents between central and satellite stations are replaced by directed beams of microwave radio energy which are initiated in the central station, and intercepted and reflected at each of the satellite stations. Messages are transmitted from the central station by modulation of the transmitted carrier beam; and from the respective satellite stations by modulation of the reflected carrier beam.

It is therefore the broad object of this invention to provide for improved signal transmission and reception in directional radio telephone systems.

A more specific object is to provide improved methods and apparatus for establishing contact between stations in systems of the aforesaid type.

Another object is to provide for distance discrimination between satellite stations located in the same direction from the central station.

Still another object of the invention is to reduce signal distortion due to phase fluctuation in a system of the aforesaid type.

In carrying out the objects set forth above, in accordance with the present invention, a microwave beam telephone system of the general type disclosed includes a rotating central station carrier beam which repeatedly scans a plurality of outlying satellite stations to locate calls, and which fixes its orientation in the direction of a particular calling station for the mutual transmission of speech and ringing signals. When a subscriber at a particular satellite station wishes to make a call, he impresses a modulating calling signal on the reflected carrier beam which actuates control means in the central station to fix the orientation of the carrier beam in his direction whereby it serves as a medium for the transmission of speech signals between the central station and the calling satellite station.

In order to permit intercommunication between satellite stations, duplicate sets of beam transmitting and receiving apparatus and suitable switching means are provided at the central station.

In accordance with a modification of the system described in the foregoing paragraphs, the transmitted carrier beam is impressed with a repetitive saw-tooth frequency modulation, and the signal-modulated echo beam combined with a component of transmitted carrier to produce an intermediate beat-frequency wave. Such a system provides two particular advantages; namely, it inherently reduces fluctuations in the level of the received signal due to slight shifts in the carrier frequency; and it permits discrimination between subscribers in the same direction but at different distances from the central station by means of frequency multiplex reception.

In accordance with another modification of the invention, the transmitted beam and the reflected beam are differently polarized, thereby reducing the amount of sidetone present in either the central or satellite stations.

Other objects and features of the invention will be apparent from a study of the detailed specification hereinafter and the attached drawings in which:

Fig. 1 shows a schematic drawing of a central station apparatus in accordance with the present invention, including an equalizer circuit for eliminating phase distortion, such as described in detail in Fig. 2 of application Serial No. 10,148 of W. J. Albersheim, filed at even date herewith issued as United States Patent 2,556,669, June 12, 1951;

Figure 1:
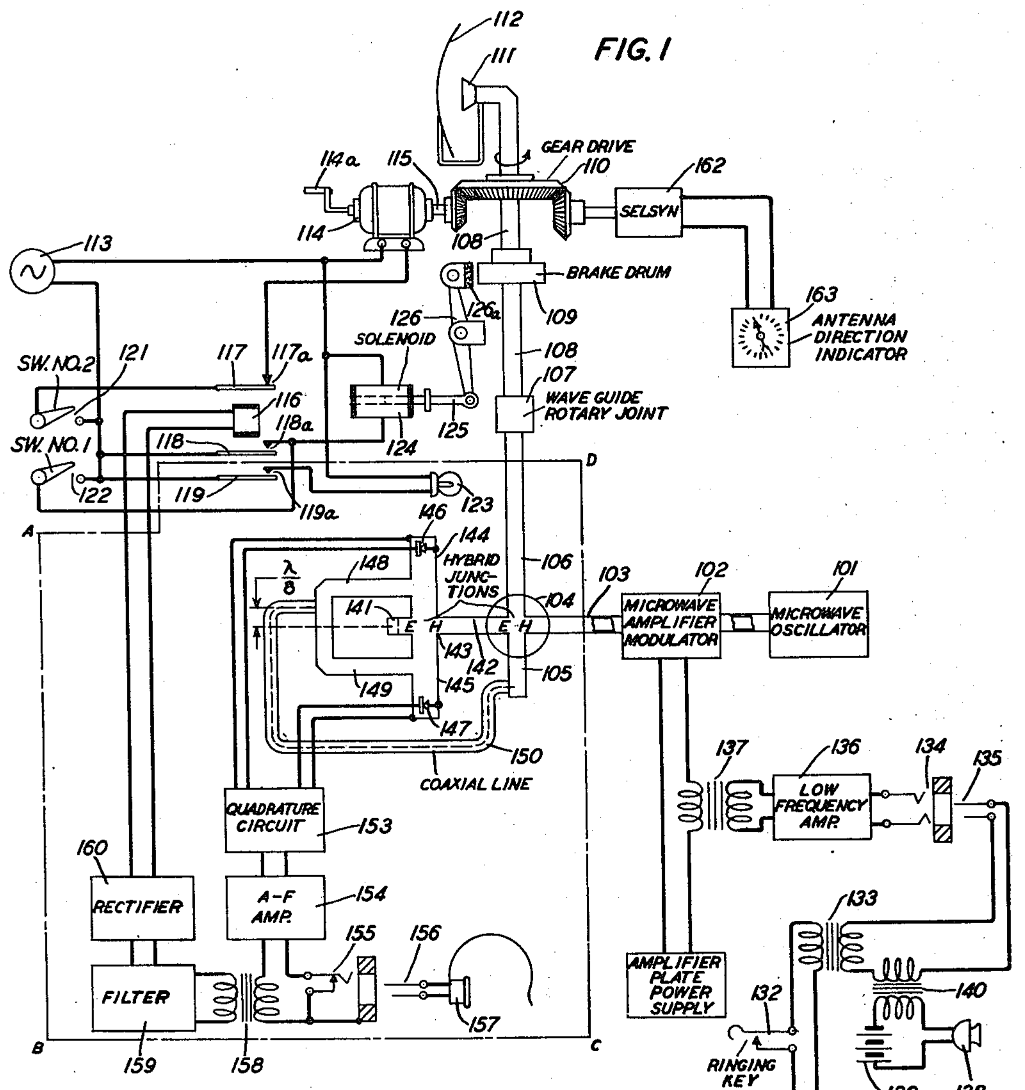

A typical embodiment of the microwave telephone system of the present invention which will now be described comprises a central station equipped as shown, for example, in Fig. 1 and a plurality of subscribers' stations equipped as shown, for example, in Fig. 3. Both the central and subscribing stations have ringing circuits and speech transmission and receiving circuits such as are customary in conventional wire transmission telephone systems. The present system is so designed that during the interval between calls, a directed microwave carrier beam generated at the central station is periodically rotated through a scaning arc in a horizontal plane thereby contacting in succession the subscribers' stations that lie within its range. If a subscriber desires to make a call, he lifts his receiver off the hook-switch in the usual manner. When the scanning beam contacts his antenna this operation impresses a fixed frequency ringing signal on the portion of the beam reflected back to the central station where the received signal actuates means to cut off the scanning drive and fix the orientation of the carrier beam in the direction of the calling station. Completion of this operation is indicated by the lighting of a signal lamp in the central station, whereupon the central station operator transmits a ringing signal over the beam which disconnects the calling subscriber's ringing equipment, and conditions the system for the transmission and reception of speech signals between the central and calling stations. Assuming that the calling subscriber wishes to contact another subscriber's station, he gives the appropriate number to the operator, whereby a second carrier beam at the same central station is directed toward the called station, and impressed with a ringing signal to ring the called subscriber's bell. Upon receiving a return ringing signal from the called station, the operator plugs jumpers between the respective speech transmitters and receivers of the two central station circuits which operation conditions the system for speech transmission between the calling and called subscriber's station. When either of the subscribers hangs up, that fact is indicated to the central operator by a ringing signal which lights a signal lamp, whereupon the operator makes the proper disconnections and reestablishes scanning operation of the beams to locate calls. A single central station preferably includes several identical transmitting and receiving circuits, so that calling stations are continuously being located, and a number of pairs of subscribers' stations may be engaged in conversation at one time. To obviate the necessity of providing a plurality of speech modulating equipments at the central station, suitable talking and listening switches of a type well known in the art such as for example voice operated switches may be provided to transfer the speech modulations received from a subscriber on one central station beam for transmission to a subscriber on another central station beam.

Referring to Fig. 1 of the drawings, which shows one form of a transmitting and receiving circuit in the central station, a conventional microwave oscillator 101 of one of the types known in the art, which is adapted to produce oscillations at a power of the order of 50 watts having a wavelength of, for example, 3.2 centimeters is connected through a conventional wave guide to a microwave amplifier-modulator 102, which may be any of the types well known in the art. The amplifier-modulator 102 is connected to the arm 103 of a hybrid junction 104 commonly known as the "Magic T," which comprises a four-arm E—H junction such as shown for example in Fig. 7 of application Serial No. 581,285 filed on March 6, 1945 by W. A. Tyrrell, issued as United States Patent 2,445,896, July 27, 1948.

In the hybrid junction 104, the two conjugate branches 105 and 106 which are coplanar with the arm 103 are constructed to present substantially equal impedances at the junction, whereby no energy entering the junction through the arm 103 can reach the output arm 142 in the electric plane.

The hybrid junction 104 therefore functions to separate the carrier wave output of the amplifier-modulator 102 into two substantially equal components, one of which is conducted into the receiver through the wave guide arm 105 and the connected coaxial line 150 to act as a beating wave, and the other of which is conducted into the antenna feed circuit. This comprises the wave guide rotary joint or choke 107, such as disclosed, for example, in application Serial No. 464,333 to A. G. Fox, filed November 3, 1942, issued as United States Patent 2,438,119, March 23, 1948, the fixed portion of which is connected to the guide arm 106, and the rotatable portion of which is connected to the hollow cylindrical feed wave guide 108. The rotatable feed guide 108 is connected to the antenna feed horn 111 which is disposed at the focus of the parabolic reflector 112 which is dimensioned and constructed in accordance with well-known practice to produce a substantially parallel directed beam of carrier radiation, the allowable spread and the power of the transmitted beam being a function of the distances between central and subscribing stations which are here assumed to be of the order of several miles.

The antenna 112 and associated feed 111 is adapted to be rotated by means of a meshed gear drive 110 mounted on the wave guide pipe 108, which is driven to rotate by the drive shaft 115 connected to motor 114. A handle 114*a* attached to the motor 114 provides for manual rotation of the antenna assembly. The motor 114 is connected to the alternating current power source 113 through a conducting circuit which includes the armature and contacts 117 and 117*a* of the relay 116 and the manually operated switch 121. Also connected to the alternating current source 113 through the armature and contacts 118 and 118*a* of the relay 116 is the solenoid 124 which functions to actuate the armature 125 connected to the pivoted member 126, to control the engagement of the brake shoe 126*a* with the brake drum 109 mounted on the hollow guide 108. In addition, the alternating current source 113 energizes the signal lamp 123 through a circuit which includes the armature and contacts 119 and 119*a* of the relay 116.

A circuit providing signal currents to modulate the outgoing carrier waves originating in the microwave oscillator 101 is connected to the microwave amplifier-modulator 102. This circuit includes a conventional telephone transmitter 138 energized by the direct current power source 139, and connected in series with the primary coil of the transformer 140, so that currents representing speech fluctuations are conducted to the input of the low frequency amplifier 136 through the secondary of the transformer 140 and a jack and plug connection 134—135. The input of the amplifier 136 is also connected to receive a superaudible ringing current from the oscillator 131, which may assume any of the forms well known in the art adapted to produce oscillations of the order of, for example, 20 or 30 kilocycles per second. The connecting circuit between the ringing oscillator 131 and the amplifier 136 includes the normally open ringing push button 132, the transformer 133 and the jack and plug connection 134—135.

A circuit for receiving and demodulating the carrier waves received through the antenna assembly 111—112 includes the cylindrical rotatable wave guide 108, the wave guide rotary joint 107, to which is mechanically coupled the fixed wave guide arm 106 of the hybrid junction 104, which is so constructed that the receiving waves separate into two components, one of which is absorbed in the transmitting circuit, and the other of which passes into the receive wave guide arm 142.

The wave guide arm 142 is connected to feed into the magnetic plane of a second hybrid junction 143, which is substantially similar to the junction 104, and which is terminated in the electric plane in an impedance matching stub line 141, whereby the incoming modulated waves are separated into two equal components passing into the wave guide arms 144 and 145, wherein they are mixed with unmodulated components of carrier wave which are respectively 90 degrees out of phase. These latter components are derived directly from the output of amplifier-modulator 102 through the arm 105 of the hybrid junction 104 and the coaxial attenuation line 150, which feeds into the respective wave guide arms 144 and 145 through separate connecting wave guide arms 148 and 149 which differ in length by a quarter of a wave guide wavelength. The attenuation line 150, the guide arms 144 and 145 terminate in the crystal detectors 146 and 147, the outputs of which are separately fed into the quadrature circuit 153 which serves to combine these components in such a manner as to reproduce a signal current which is substantially free from phase distortion which is caused by slight frequency or phase shifts on the output of the microwave oscillator 101. The quadrature circuit 153 is described and shown in detail with reference to Fig. 2 of application Serial No. 10,148 to W. J. Albersheim, filed at even date herewith.

For operation at a wavelength of 3.2 centimeters for example, all of the connecting wave guides preferably have rectangular cross-sectional dimensions of, for example, 1.016 centimeters by 2,286 centimeters. Except where specified otherwise, the lengths of the connecting wave guides are determined by convenience.

The circuit which responds to the demodulated speech and ringing currents emerging from the output of the quadrature circuit 153 includes the conventional audio-frequency amplifier 154, the output of which is connected in parallel through the plug and jack combination 155—156 to the telephone receiver 157 and through the transformer 158 to the calling signal response circuit connected to actuate the relay 116. The calling response circuit includes the filter 159 tuned to the particular ringing frequency, and the conventional rectifier 160, the output of which is connected to energize the relay 116 thereby causing operation of its armatures 117, 118, and 119 to respectively break contact 117*a* cutting off the antenna motor, make contact 118*a* applying the brake 126*a* to the drum 109 on the rotating guide 108, and make contact 119*a* lighting the signal lamp 123.

In the general case, the location and identification of a particular calling station is indicated to the central station operator by the antenna direction indicator 163, which is equipped with a pointer adapted to move along a scale in synchronism with the rotational motion of the antenna. This is accomplished by a mechanical connection between the gear drive 110 and a conventional self-synchronizing motor 162, the output of which is connected to move the pointer of the indicator 163. Prior to the operation of the system, the scale on the direction indicator 163 is calibrated in terms of the angular position of each of the subscribers' stations on the horizontal scanning arc through which the antenna moves.

Moreover, as pointed out hereinbefore, the problem of intercommunication between subscriber's stations is solved in the general case by providing a plurality of identical beam transmitters and receivers at the central station, which are either equipped with separate speech modulating circuits or with suitable talking and listening switches operating in conjunction with a single speech modulating circuit.

However, a special problem arises with regard to identification of and intercommunication between subscriber's stations located at different distances but in the same direction from the central station.

As pointed out with reference to Fig. 1 hereinbefore, in a homodyne system, level fluctuation occurs in the received signal as a result of slight shifts in frequency in the carrier-wave oscillator. In the system of Fig. 1, this distortion is compensated for in the quadrature equalizer circuit 153 disclosed in the application of W. J. Albersheim supra.

The presence of such level fluctuations may be explained theoretically as follows.

Let a carrier wave, $$e_t = e_0 \cos \omega t \qquad (1)$$

be radiated by the central station. It arrives at the satellite station located at a distance D with an attenuation A and a delay time $$T = D/c \qquad (2)$$

$c$ being the speed of light in the intervening atmosphere. After passing through subscriber's audio frequency modulator it has approximately the form $$e_s = Ae_0(1+m \cos at) \cos (\omega t - \omega T) \qquad (3)$$

$m$ being the modulation factor and $a$ the instantaneous frequency. The subscriber-modulated carrier wave $e_s$ is reflected back to the central station where it undergoes a second attenuation A and time delay T and is received as an echo.

$$e_r = A^2 e_0(1+m \cos at) \cdot \cos (\omega t - 2\omega T) \qquad (4)$$

or $$e_r = A^2 e_0(1+m \cos at) [\cos \omega t \cos 2\omega T + \sin \omega t \sin 2\omega T] \qquad (5)$$

If this echo is mixed with a component of the transmitted carrier $e_t$ and passed through a square-law detector, the derived low frequency component is $$e_{D_1} = k \cdot (1+m \cos at) \cdot \cos 2\omega T \qquad (6)$$

where $k$ is a constant of proportionality. This has maximum absolute values when $$2\omega T = N\pi \qquad (7)$$

It is zero when $$2\omega T = n\pi \pm \frac{\pi}{2} \qquad (8)$$

Assuming a constant delay time T, gain fluctuation from maximum to extinction occurs for a frequency shift in which $$\Delta\omega=\frac{\pi}{4T} \qquad (9)$$

In this case, $$\frac{\Delta\omega}{\omega}=\frac{\lambda}{8D} \qquad (10)$$

where $\lambda$ is the wavelength.

By way of illustration, let the distance between the central station and a selected subscriber station be ten miles which equals $$1.6\cdot10^6 \text{ cm.} \qquad (11)$$

Assume that the carrier wave has a wavelength equal to 1.25 cm. (12). In such case, extreme fades occur for $$\frac{\Delta\omega}{\omega}=\frac{1.25}{8\cdot1.6\cdot10^6}=10^{-7} \qquad (13)$$

Identical considerations apply for small variations $\Delta T$ of the delay time T. To keep fades within 1 decible the frequency modulation by hum, noise, etc., and the path variation due to atmospheric conditions must be kept within a small fraction of $10^{-7}$, which is impractical.

Figure 2B:
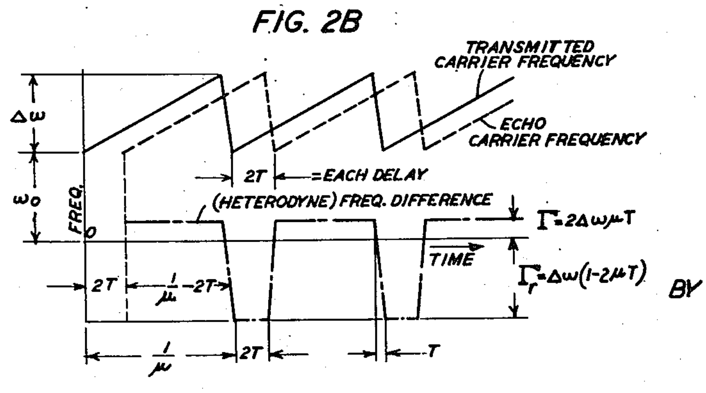
Fig. 2B is a graph illustrating certain theoretical principles of the embodiment of Fig. 2A.
Figure 2A:
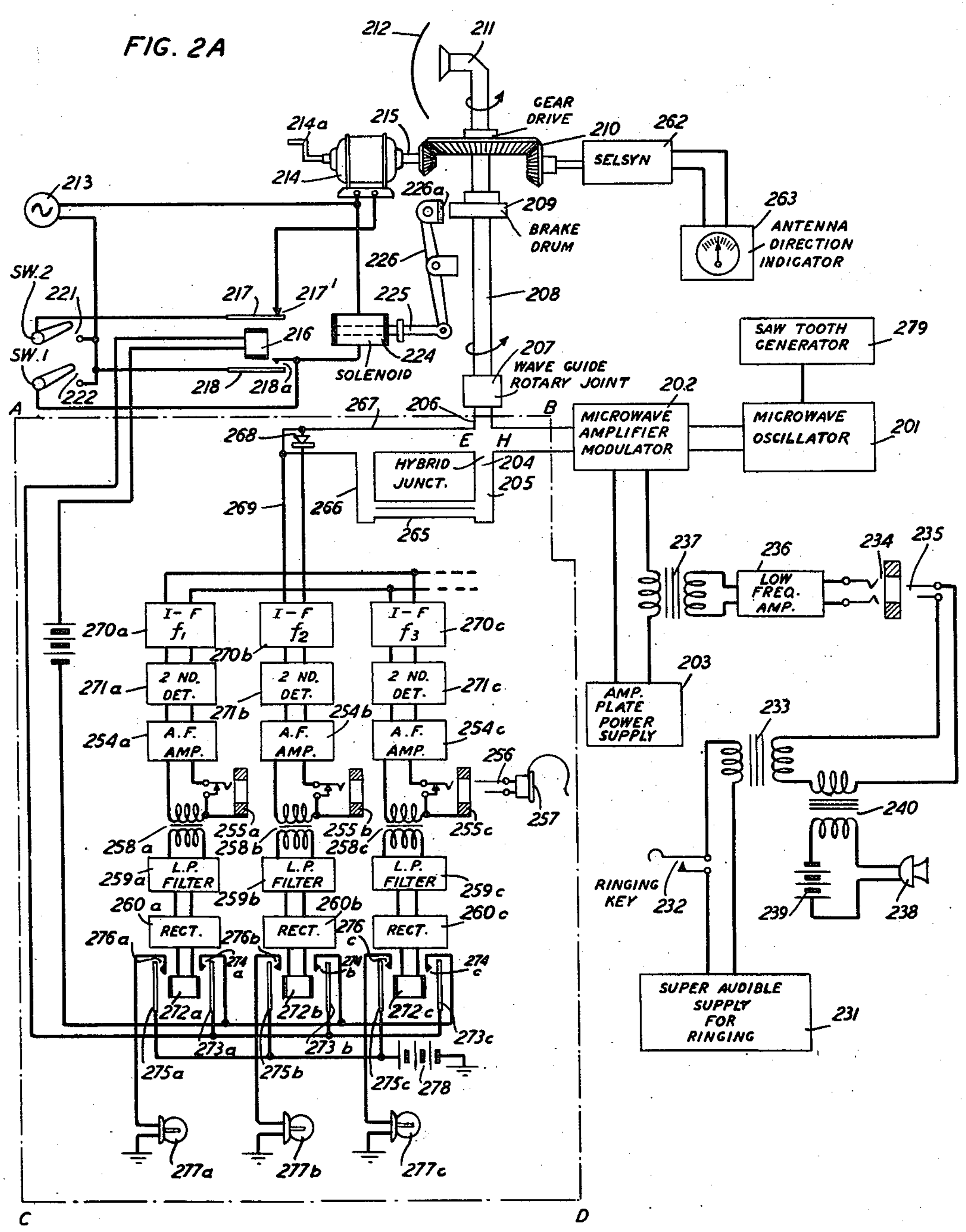
Fig. 2A shows a modification of the central station apparatus of Fig. 1 to include means for impressing a saw-tooth frequency modulation on the transmitted carrier beam, and a frequency-division multiplex receiving circuit adapted to distinguish between satellite stations at different distances from the central station.

In compensating for fluctuations in the signal level, such as the aforesaid, the embodiment of Fig. 2A, to be described presently, employs a different expedient than the quadrature equalizer circuit of Albersheim supra. In accordance with the modification of Fig. 2, a repetitive saw-tooth frequency modulation is impressed in the transmitted central station carrier beam; and the amplitude-modulated echo wave reflected back to the central station from the subscriber or satellite station is beaten with a component of transmitted carrier to produce an intermediate frequency wave. Such a system has the added feature of providing for discrimination between subscribers located at different distances but in the same direction from the central station by an arrangement for frequency-division multiplex reception.

The operation of the system will be better understood from a study of the following theoretical considerations.

Referring to Equation 6 above, it is seen that the output of a homodyne square-law modulator is the product of the desired signal multiplied by a factor $\cos 2\omega T$.

In the embodiment of Fig. 2A, as pointed out, the carrier frequency $\omega$ is modulated by a saw-tooth wave of frequency $\mu$. During nearly the entire period $$\omega=\omega_0+\Delta\omega\cdot\mu t \qquad (14)$$

and $$2\omega T=2\omega_0 T+2\Delta\omega T\cdot\mu t \qquad (14a)$$

hence $$\cos 2\omega T=\cos(\Gamma t+\varphi_0) \qquad (15)$$

with $$\Gamma=2\Delta\omega T\mu=\frac{2\Delta\omega D}{c}\mu \text{ which is} >\mu \qquad (16)$$

and $$\varphi_0=2\omega_0 T \qquad (17)$$

Hence the desired signal is modulated by the supersonic intermediate frequency $\Gamma$. In this form it may be amplified by an intermediate frequency amplifier. If the supersonic modulation is removed by a demodulator or detector which may be any non-linear type, such as, for example, a square-law detector and a low-pass filter connected thereto, the resultant product is proportional to $1+m\cos at$. If desired, the direct current component may be removed by an additional audio frequency amplifier.

The foregoing relationships are illustrated in Fig. 2B wherein the solid saw-tooth line in the upper portion indicates the transmitted carrier frequencies, and the dotted line indicates the echo carrier frequency received by the central station which is delayed by 2T. This delay time is, in most practical cases, smaller than the saw-tooth repetition period $$\frac{1}{\mu}$$

although this is not necessary.

During the time interval $$\frac{1}{\mu}-2T$$

the transmitted carrier frequency is $\omega_0+\Delta\omega\cdot\mu t$ and the echo carrier, $\omega_0+\Delta\omega\mu(t-2T)$. Hence, the carrier difference $\Gamma$ is equal to $2\Delta\omega\mu T$, as derived in Equation 16. During the interval 2T in which the transmitted frequency has swept back, one saw-tooth frequency swing, that is $-\Delta\omega$, the echo frequency is still increasing; the transmitted carrier frequency is therefore $$\omega_0+\Delta\omega(\mu t-1)$$

and the echo carrier, $\omega_0+\Delta\omega\mu(t-2T)$. Hence the difference is $$\Gamma_r=-\Delta\omega(1-2\mu T) \qquad (18)$$

This frequency difference which may also be called beat frequency or heterodyne frequency, is shown as a dash-dotted stepped line in the lower part of Fig. 2B. The edges of this stepped line show a slight deviation from vertical due to the fact that the saw-tooth back sweep, although extremely fast, requires a finite time interval $\tau$.

The apparatus of Fig. 2A is designed to produce a saw-tooth frequency modulated carrier beam which, when reflected and amplitude modulated at the satellite station, is beaten with a component of frequency modulated transmitted carrier wave to produce an intermediate frequency wave $\Gamma$ in accordance with the foregoing theory.

With the exception of the saw-tooth generator 279, that part of the embodiment disclosed in Fig. 2A which is not enclosed in the dotted line box ABCD, comprises elements substantially similar in structure and function to corresponding elements in the embodiment disclosed in Fig. 1, which are indicated by corresponding designations. Thus, the microwave oscillator 201 corresponds to the microwave oscillator 101, etc.

The conventional saw-tooth generator 279 is connected to the microwave oscillator 201 to frequency modulate the output thereof with a saw-tooth envelope preferably of superaudible frequency which increases linearly from a minimum to a maximum, returning again to minimum with a rapid fly-back.

The frequency modulated output from the oscillator 201 passes through the amplifier-modulator 202 which is connected so that its output passes into the hybrid junction 204, which is substantially similar to the hybrid junction 104 of Fig. 1, and is constructed with conjugate arms 205 and 206 adapted to present substantially equal impedances at the junction. The arm 205 is connected to supply a beating carrier component to the receiving circuit through the coaxial attenuator 265 and connecting arm 266. The attenuator 265 can take the form of a wave guide attenuator or any other attenuator known to the art. The arm 206 is connected to impress energy on and receive energy from the antenna 211—212.

The wave guide arm 267 is so connected to the hybrid junction 204, that it receives a component of the modulated incoming carrier wave, which is beaten with a substantially greater component of unmodulated carrier wave supplied through the connecting arm 266, and the coaxial attenuator 265. The wave guide 267 is terminated in a crystal detector 268 which serves as a demodulator of the beat frequency wave and which is connected to a frequency division multiplex circuit, which functions to separately receive the speech and ringing signals from the satellite stations in the same direction but at different distances from the central station.

The frequency division multiplex circuit, which is enclosed by the dotted line box A, B, C, D, in Fig. 2A, will now be described in detail.

The output circuit of the crystal demodulator 268 is connected to a plurality of conventional intermediate frequency amplifiers 270*a*, 270*b*, 270*c*, etc. connected in parallel, and each tuned to amplify a different range of beat frequency waves from the demodulator 268. Alternatively, a single broad-band intermediate frequency amplifier may be used, and the output divided into a desired plurality of channels by conventional band-pass filters.

Each of the intermediate frequency amplifiers 270*a*, 270*b*, 270*c*, etc., or alternatively, different frequency channels from a single intermediate frequency amplifier, is respectively connected to one of audio detectors 271*a*, 271*b*, 271*c*, the output terminals of which are connected to the respective audio amplifiers 254*a*, 254*b* and 254*c*.

The individual speech receiving circuits for the different frequency bands, respectively include audio amplifiers 254*a*, 254*b*, 254*c*, jacks 255*a*, 255*b*, 255*c* which operate upon insertion of the plug 256 to energize the conventional telephone receiver 257.

For reception of the ringing signals, the separate audio outputs of the amplifiers 254*a*, 254*b*, 254*c* are fed into the respective transformers 258*a*, 258*b*, 258*c*. These are connected through to the low-pass filters 259*a*, 259*b*, and 259*c*, which may be tuned to different frequency identifying signals to the respective rectifiers 260*a*, 260*b*, and 260*c* to energize the relays 272*a*, 272*b*, and 272*c*.

The relays 272*a*, 272*b* and 272*c* respectively operate to actuate armatures 273*a*, 273*b*, 273*c* which close corresponding contacts 274*a*, 274*b*, 274*c* to energize the relay 216, corresponding to the relay 116 of Fig. 1 which functions to operate the motor control circuit and brake to halt the antenna scanning mechanism. Upon operation, the relays 272*a*, 272*b*, 272*c* also actuate the respective armatures 275*a*, 275*b*, 275*c* to engage respective contacts 276*a*, 276*b*, 276*c*, thereby closing the circuit of the battery 278 to energize the proper one of the signal lamps 277*a*, 277*b*, 277*c*, whereby the particular calling satellite station is identified to the central station operator.

Figure 3:
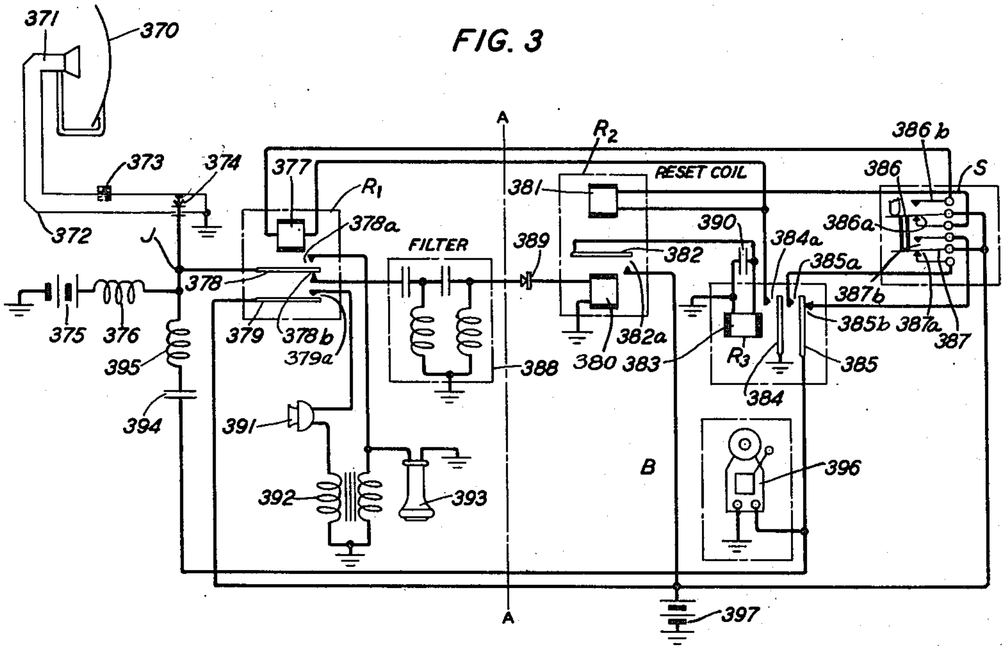
Fig. 3 shows a schematic drawing of a typical satellite station in the system of the present invention.

Discrimination between outgoing signals from the central station destined for different satellite stations is achieved in a manner disclosed with reference to Fig. 5A of application Serial No. 10,148 to Albersheim, filed at even date herewith, whereby a bandpass filter tuned to a separate microwave frequency can be inserted in the receiving circuits of each of the satellite stations, as shown in Fig. 3, and described hereinafter, making a particular subscriber's receiving equipment responsive to only a part of the frequency band over which the saw-tooth FM of the transmitter sweeps. Let, for example, subscriber A be limited to the lower half of the maximum sweep range of the transmitted carrier wave and subscriber B to the higher half of that range. Then discrimination in favor of A or B, respectively is obtained at the central station by limiting the transmitter FM sweep to the lower or higher half of the maximum swing, as desired. This is preferably achieved by biasing the control voltage applied to modulate the output of the microwave oscillator, in a manner disclosed with reference to Fig. 5*b* in the Albersheim application supra.

Fig. 3 of the drawings shows a typical subscriber's circuit which is adapted to perform the dual functions of receiving the speech and ringing signals impressed as modulations on a beam of carrier waves from the central station, and of transmitting the subscriber's speech and ringing signals to the central station by impressing them as modulations on the reflected portion of the unmodulated carrier beam supplied from the central station.

The subscriber's circuit of Fig. 3 comprises in combination a paraboloidal antenna reflector 370 at whose focus is disposed a wave guide feed horn 371. The aforesaid units are shaped and dimensioned in accordance with well-known practice to provide for the reception and retransmission of the substantially parallel directed carrier beam from the central station, which by way of example has been assumed to have a wavelength of 3.2 centimeters. The feed horn 371 is connected to a wave guide chamber 372 of rectangular cross-section of the order of one-half inch by one inch, and having a convenient length, which is terminated in a crystal detector 374. The design of such crystal detectors is well known in the art and has been described by C. F. Edwards in a paper "Microwave Converters" published in the November 1947 issue of the Proceedings of the Institute of Radio Engineers, pages 1181–1191.

I have discovered that distortion in the signal reflected back to the central station is largely reduced by locating a capacitative probe 373 in front of the crystal, and adjusting the longitudinal position and penetration of such probe in the guide 372 to obtain optimum reception and transmission.

The crystal detector 374, which may be biased one or more volts negatively by connection through the junction J and the choke coil 376 to the battery 375, is connected to a telephone speech and ringing circuit which includes the telephone transmitter 391, the telephone receiver 393, the bell 396 and its associated energizing circuit, the hook-switch S, and the relays $R_1$, $R_2$, and $R_3$.

The conventional relay $R_1$ comprises the energizing coil 377 and the associated armature 378 which operates to close the normally open contact 378*a*, and the associated armature 379 which operates to close the normally open contact 379*a*. The armature 378 is connected to the output of the detector 374 and the battery 375 through the junction J. The armature 379 is connected to the positive direct current source 397. The contact 379*a* is connected to the telephone transmitter 391 in series to ground with the primary coil of the iron-cored transformer 392, and the contact 378a is connected to the telephone receiver 393 which is in parallel with secondary coil of the transformer 392.

The normally closed contact 378b of the relay $R_1$ is connected to the conventional filter 388 which is tuned to the frequency of the superaudible signal impressed on the carrier beam at the central station. The filter 388 is connected through the conventional rectifier 389 to the ringing coil 380 of the relay $R_2$.

The relay $R_2$, which may assume the form, for example, of the Weston sensitrol relay, model 705, type N, is preferably designed to have a sensitivity to power levels of 100 decibels below one watt. It comprises a ringing coil 380 and a reset coil 381, which operates the armature 382 in different directions to make and break the contact 382a. The armature 382 remains actuated in one direction until attracted in the other direction. The contact 382a is connected to the positive direct current source 397; and the armature 382 is connected to one terminal of the energizing coil 383 of the relay $R_3$.

The relay $R_3$ comprises the energizing coil 383 connected in parallel to ground with the condenser 390, the associated armature 384 which operates to close the contact 384a, and the associated armature 385 which operates to make the contact 385a and break the contact 385b. The armature 384 is connected to ground, while the associated contact 384a is connected to a parallel circuit one branch of which is connected to the energizing coil 377 of the relay $R_1$ and the other branch of which is connected to the reset coil 381 of the relay $R_2$. The armature 385 of the relay $R_3$ is connected to a parallel circuit, one branch of which passes through the condenser 394 and the inductance 395 to the junction J.

The contacts 385a and 385b are connected to the hook-switch S in a manner which will presently be described. The hook-switch S comprises the mechanically coupled armatures 386 and 387, which are adapted, when the receiver is in place, to respectively close contacts 386a and 387a, and when the receiver is released therefrom, to break the aforesaid contacts, and close contacts 386b and 387b. The make contact 386b is connected to the coil 377 of the relay $R_1$, the break contact 386a to the reset coil 381, the make contact 387b to the normally closed contact 385a of the relay $R_3$, and the break contact 387a to the normally open contact 385a of the relay $R_3$. The armatures 386 and 387 are connected to the direct current battery 397.

In order to provide a better understanding of the operation of the circuits hereinbefore described, a complete call will now be traced.

Referring to Fig. 3, the subscriber at the calling station lifts the receiver 393 from the hook-switch S, which operation connects the battery 397 to the bell 396 through a circuit which includes the armature 387 and contact 387b of the hook-switch S and the armature 385 and contact 385b of the relay $R_3$. The alternating voltage developed across the bell is applied to the crystal 374 through a circuit which includes the condenser 394, the inductance 395, and the junction J. The aforesaid variations in voltage which are impressed on the crystal detector 374 cause corresponding variations in the terminating impedance of the wave guide cavity 372, whereby microwave energy entering the wave guide feed horn 371 from the antenna reflector 370 is variously absorbed or reflected back to the antenna 370—371 for retransmission to the central station.

Thus, when the scanning carrier beam from the central office sweeps past the antenna 370—371, a modulated echo is returned to the central office which indicates that a subscriber A wishes to make a call, and which automatically orients the scanning beam in A's direction in the following manner. Referring to Fig. 1, the reflected carrier beam, modulated with the ringing signal is received by the central station antenna 111—112, passes through the connecting wave guide 108, the rotary joint 107, and the wave guide arm 106 into the hybrid junction 104. At the junction 104, the received carrier wave is separated into two components, one of which is dissipated in the transmitting circuit and the other of which passes into the wave guide 142 where it is combined with a portion of transmitter carrier and demodulated by operation of the twin crystal detectors 146 and 147 and the quadrature equalizer 153. The demodulated ringing current from the output of the quadrature equalizer circuit 153 passes through the low frequency amplifier 154, the transformer 158, filter 159 and rectifier 160, to energize the relay 116, which actuates its armatures 117, 118 and 119. The aforesaid operation breaks contact 117a, thereby halting the motor 114, and closes contacts 118a and 119a, thereby applying the brake shoe 126a to the brake drum 109 on the antenna shaft, and lighting the signal lamp 123, whereby the central station operator opens the switch 121 to disable the scanning operation for the period of the call, and closes the switch 122 to lock-operate the antenna brake.

The operator at the central office must now signal subscriber A that the central office is ready to receive the call. In order to do this, the operator inserts the plug 135 in the jack 134 and presses the ringing key 132, whereby a superaudible ringing signal from the oscillator 131 passes through the transformer 133, the low frequency amplifier 136, and the transformer 137 and is impressed on the carrier output in the microwave amplifier-modulator 102. The modulated carrier wave passes through the hybrid junction 104 and the connecting guides to the antenna 111—112, where it is transmitted in the form of a directed beam to the subscribing station A.

Referring again to Fig. 3, when the modulated ringing signal reaches station A, it is received by the antenna 370—371, from which it passes into the wave guide 372, where it is demodulated by the crystal detector 374. The demodulated signal passes through the junction J, the armature 378 and normally operated contact 378b of the relay $R_1$ and into the tuned filter 388. The output of the filter 388 passes through the rectifier 389 and energizes the ringing coil 380 of the relay $R_2$ to pull over the armature 382 and engage contact 382a, thereby applying the potential of the battery 397 to energize the coil 383 of the relay $R_3$ and charge up the condenser 390 connected thereacross. This operation causes the armature 385 to break contact 385b, thereby cutting off the circuit from the battery 397 to the bell 396 extending through the armature 387 and contact 387b of the hook-switch S, thereby indicating to subscriber A that the central station is ready to receive a call.

Simultaneously, the subscriber A's speech transmitting and receiving circuit is connected as follows:

The relay $R_1$ is energized by a circuit which is completed from the battery 397, through the armature and contact 386—386b of the hook-switch S the energizing coil 377 and the armature and contact 384—384a to ground. The armatures 378 and 379 are thus actuated, breaking the contact 378b and respectively connecting contacts 378a and 379a. This operation connects the battery 397 to the circuit of the telephone transmitter 391, and the telephone receiver 393 to the junction J, whereby speech signals may either be impressed on the input of the detector 374 through a circuit which includes the transformer 392, or received from the output of the detector 374. In the former case, the unmodulated microwave carrier beam impressed on the antenna 370—371 from the central station is modulated with speech signals and reflected back to the central station in the manner described with reference to the ringing signals; while in the latter case, the speech modulations impressed on the carrier beam at the central station are detected in the usual manner. The relays $R_1$, $R_2$ and $R_3$ remain in operation during the conversation, inasmuch as the armature 382 remains engaged to contact 382a as long as the hook-switch S is open, disengaging armature and contact 386 and 386a and thereby disconnecting the reset coil 381 from the battery 397.

Subscriber A now gives subscriber B's number to the operator. Referring again to Fig. 1 of the drawings, the operator now orients a duplicate beam in the direction of subscriber B by operating a second set of central station apparatus as follows: By means of the handle 115a attached to the shaft 115 which operates the gear-drive 110, the antenna 111—112 is turned in the proper direction as indicated on the scale of the antenna direction indicator 163. By inserting the plug 135 in the jack 134 and depressing the key 132 in the second central station transmitter, the operator transmits a supersonic ringing signal to station B, in the manner described hereinbefore. This signal is intercepted by subscriber B's antenna, and actuates the relays $R_1$, $R_2$ and $R_3$ in station B, as described with reference to station A hereinbefore. Inasmuch as the hook-switch S is initially down, the bell 396 is connected to the battery 397 through a circuit which includes the armature and contact 385—385a of the relay $R_3$, and the armature and contact 387—387a of the hook-switch S. Simultaneously, the alternating voltage developed across the bell 396 is impressed on the crystal 374 through a circuit which includes the condenser 394 and the inductance 395, thereby providing a low frequency ringing signal which is transmitted back to the central station permitting the central station operator to hear the ringing of the subscriber's bell.

Intermittent operation of the bell 396 is brought about in the following manner: Operation of the armature 384 to engage contact 384a connects the circuit of the reset-coil 381 to ground, so that the armature 382 is attracted to disengage contact 382a, causing the relay $R_3$ to deenergize after a short interval required for the discharge of the condenser 390, and disengage contacts 384a and 385a, thereby breaking the energizing circuit of the bell 396. This cycle is repeated as long as the central station operator continues to ring, or until subscriber B lifts the hook-switch S to answer the call.

If the subscriber B lifts the hook-switch S while the bell 396 is still ringing, armature and contact 387—387a are disengaged, thereby cutting off the battery 397, which operation causes the ringing to cease. If, on the other hand, the subscriber B lifts the hook-switch S during the interval when bell 396 is not ringing and relay $R_3$ is open, the bell 396 is reconnected through a circuit which includes armature and contact 385—385b of the relay $R_3$ and armature and contact 387—387b of the hook-switch S. The bell therefore continues to ring indicating to the operator that the central office must continue to transmit the ringing signal until armature 382 and contact 382a are engaged, thereby lock-operating relays $R_1$, $R_2$, and $R_3$ for the conversational period. When armature 382 and contact 382a are engaged, relay $R_3$ is actuated connecting armature 384 to contact 384a which causes relay $R_1$ to opertae. The contact 385b is now disconnected and the bell stops ringing, indicating to the operator that the subscriber has answered.

At the central station, the operator disconnects the plug 156 from the jack 155, and the plug 135 from the jack 134, thereby disconnecting the telephone transmitters and receivers in each of the respective central station apparatus, and in their steads inserts jumpers which connect the receiving pack 155 of one of said apparatus to the transmitting jack 134 of the other apparatus, and vice versa. This conditions the system for speech transmission and reception between subscribing stations A and B.

At station A, speech signals impressed on the transmitter 391 induce currents in the secondary coil of transformer 392 which pass through the armature and contact 378—378a and the junction J and are impressed on the crystal 374, changing its impedance, and thereby modulating the carrier beam which is received from the central station and reflected back thereto from the wave guide 372 and the antenna 370—371.

The modulated reflected carrier beam is intercepted by the antenna 111—112 in the first central station apparatus, and passed therefrom into the receiver in the same manner as the ringing signals, where it is homodyned with a component of unmodulated carrier wave. The speech output is conducted from the output of the audio-amplifier 154 in the first central station apparatus through the jack 155 and connecting jumper to the speech input jack 134 of the second central station apparatus. The speech signals thus impressed on the second apparatus pass through the audio amplifier 136 and into the microwave amplifier-modulator 102, where they serve to modulate the microwave carrier beam which is radiated from the second antenna 111—112 in the direction of station B.

When the speech modulated carrier beam from the central station is intercepted by the antenna 370—371 at station B, the modulations thereof are detected by the crystal 374 in the wave guide 372, and impressed on the telephone receiver 393 through a circuit which includes the junction J and the armature and contact 378—378a of the relay $R_1$. In a similar manner, subscriber B's speech signals are transmitted to subscriber A.

At the termination of the call, the receiver is replaced and hook-switch S depressed by one or both parties, thus causing one or more ringing signals to be transmitted to the central station, during the period of discharge of the condenser 390, for which interval the relay $R_3$ remains operated and connects the battery 397 to the bell 396, whereby a low frequency signal is transmitted as described hereinbefore. These signals are received in the manner hereinbefore described by one or both sets of central station apparatus, wherein the respective relays 116 are actuated, lighting the signal lamps 123, and notifying the central station operator of the termination of the call. The operator removes the connecting jumpers from the speech circuits, and in each of the sets of apparatus, opens the switch 122 to release the brake-shoe 126a from the brake-drum 109 on the antenna shaft, and closes the switch 121 to reestablish the scanning operations of the antennas.

For convenience of illustration, the system of the present invention has been described structurally and in operation with reference to particular sets of apparatus in the central station and the subscriber's stations, such as shown in Figs. 1, 2, and 3 of the drawings. It will be quite apparent to those skilled in the art, that the system of the present invention is not confined to any of the particular circuit arrangements shown or any of the specific elements thereof, and may take numerous alternative forms such, for example, as the central station and subscriber's circuit shown in Fig. 4, which comprises a system in accordance with the present invention in which the transmitted and received carrier beams are polarized in different planes.

Figure 4:
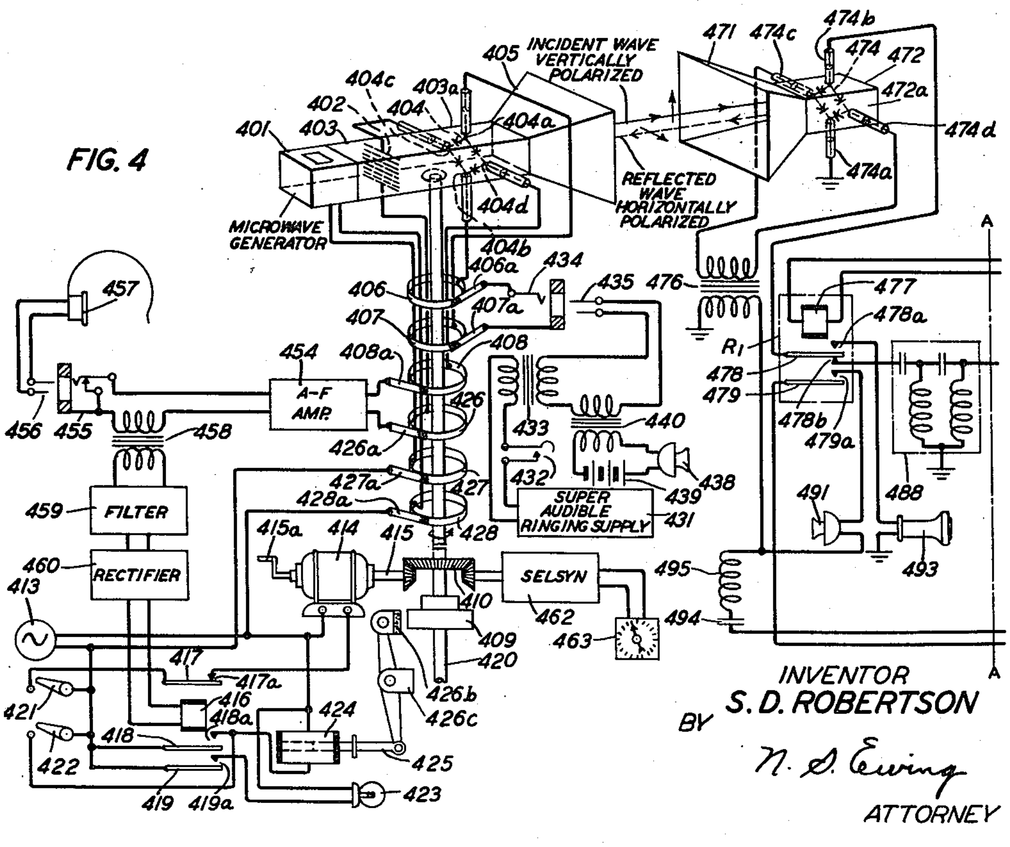
Fig. 4 shows a schematic drawing of a system in accordance with the present invention in which the transmitted and reflected beams are differently polarized.

In accordance with the arrangement shown in Fig. 4, the central office transmits a vertically polarized wave which is either modulated with speech or ringing signals at the central station or unmodulated. If the wave arrives at the subscriber's station modulated, it is there demodulated by means of a bridge-combination of four crystals connected in series-parallel. If the wave arrives unmodulated and if the subscriber impresses a speech signal across the two horizontal terminals of the bridge, echo side-bands are generated with a horizontal polarization, and reflected back to the central station. Such a system, in which communication in opposite directions is carried on by means of perpendicularly polarized waves, reduces the amount of side-tone present at either station.

Referring to Fig. 4, the microwave generator unit 401 which may assume any of the forms well known in the art has a self-contained rectifier and hum filter so that it is able to operate directly from a conventional source of alternating current power 413 connected thereto through the slip ring contacts 427—427a and 428—428a. The generator 401 oscillates with a wavelength of, for example, 10 centimeters with a power output of the order of 50 watts. The vertically polarized output of the microwave generator 401 is conducted through a connecting waveguide 403 and through the grating 402 comprising a series of copper wires, such as described with reference to Fig. 1 of my application S. N. 540,588, filed June 16, 1944, issued as United States Patent 2,441,598, May 18, 1948, which is substantially transparent to the vertically polarized incident guided waves but which constitutes a substantially perfect reflector of guided waves having horizontal polarization. After passing through the grating 402 the wave enters the wave guide chamber 403a which is a continuation of the wave guide 403 and which may, for example have a cross-section of 8 by 8 centimeters and a length of the order of 20 centimeters. The output of chamber 403a is connected to feed into a directional antenna horn 405 which is shaped as a hollow truncated pyramid flaring from an inner cross-section congruent to the dimensions of chamber 403a to an outer cross-sectional dimension of, for example, 150 by 150 centimeters in a length of, for example, seven meters.

In a centrally located vertical plane in the guide 403a is disposed the detector bridge circuit 404 which comprises four crystal rectifiers 404a, 404b, 404c, and 404d, connected in series-parallel relation, together with four shorted coaxial tuning lines such as shown in Fig. 1 of my application Serial No. 540,588 supra. The outer conductors of the aforesaid four coaxial tuning lines are capacitively connected to the walls of the wave guide chamber 403a in the manner described in the above-named application Serial No. 540,588, the capacitor connector in each said coaxial being of such a size that it presents a low impedance to electromagnetic waves of frequency substantially equal to that of the microwave oscillation generator 401 presenting a relatively high impedance to the low frequency speech and ringing currents. The vertical plane of the detector bridge circuit 404 is located substantially a quarter of a guide wavelength to the right of grating 402. The optimum adjustment of this spacing is best obtained experimentally in a manner which will be apparent to anyone skilled in the art.

Across one pair of terminals 404a, 404b of the aforesaid bridge 404, which are aligned vertically in the wave guide 403a, is connected the speech transmission circuit which includes the telephone transmitter 438 energized by the direct current power source 439 and connected in series with the primary of transformer 440, so that currents representing speech fluctuations are connected to the vertical terminals 404a, 404b through the secondary of transformer 440, a jack and plug connection 434—435, and the slip ring contact connections 407—407a and 406—406a. The terminals 404a, 404b are also connected to receive a superaudible ringing current from the oscillator 431. The connecting circuit between the ringing oscillator 431 and the terminals 404a, 404b includes the normally open ringing pushbutton 432, the transformer 433, the jack and plug connection 434—435, and the slip-ring contacts 406—406a and 407—407a.

Across the other pair of terminals 404c, 404d of the aforesaid bridge 404 which are substantially aligned horizontally in the wave guide 403a, are connected the slip-ring contacts 408—408a and 426—426a which in turn are connected to the input circuit of the audio frequency amplifier 454.

The circuits connected to the output of audio amplifier 454 are assumed to be substantially similar to the circuits connected to the output of amplifier 154 in Fig. 1 similar circuit elements being designated with corresponding numerals.

The antenna drive control circuit may be assumed to be substantially similar to that portion of the circuit of Fig. 1 which includes the relay 116 and the associated armatures which function to control the operation of the antenna motor 114, the antenna brake 126 and the signal lamp 123.

The antenna motor 414, which is connected to the output of the drive control circuit, is mechanically coupled as shown and described with reference to Figs. 1 and 2 to the drive shaft 420 of the antenna assembly, rotatable by means of the gear drive 410 so that the horn antenna is adapted to produce a scanning vertically polarized carrier beam in the manner of the hereinbefore described central station equipment.

At the subscriber's station the directional horn antenna 471, which is of a type similar to the transmitting antenna horn 405, is connected to a wave guide 472, in which is also disposed a series-parallel bridge circuit of crystal rectifiers 474. To the right of bridge 474 the end of the wave guide 472 is closed by a conducting metal plate 472a disposed substantially a quarter of a guide wavelength from the bridge circuit 474.

The lower of the two substantially vertical terminals 474a of bridge 474 is connected to ground. The upper vertical terminal 474b is connected to armature 478 of relay $R_1$ which is identical to and serves the same function as relay $R_1$ of Fig. 3. Armature 478 makes contact to contact 478b which is connected to high-pass filter 488 which is substantially identical to and serves the same purpose as filter 388 of Fig. 3. The circuit to the right of the section line A—A is identical to the circuit to the right of section line A—A of Fig. 3 and has been omitted for simplicity in description.

When relay $R_1$ is closed the vertical terminal of the bridge 474 is connected to the telephone receiver 493 through armature 478 and contact 478a of relay $R_1$.

The two horizontal terminals 474c, 474d of bridge 474 are connected to the secondary winding of transformer 476. The primary of transformer 476 is connected to a circuit which includes the telephone transmitter 491 and relay contact 479a. Relay armature 479 is connected to the circuit to the right of section line A—A in the manner described in connection with Fig. 3. When armature 479 engages contact 479a, speech signals impressed upon telephone transmitter 491 are applied to the horizontal terminals of the bridge 474, which signals intermodulate with the carrier wave already impressed upon the bridge and generate horizontally polarized speech side-bands in the wave guide chamber 472. The horizontally polarized speech side-bands are transmitted in the direction of the central office through the antenna horn 471. Ringing signals originating at the subscriber station in the circuit to the right of section line A—A are impressed upon the horizontal terminals of the bridge through a circuit which includes the inductance 493, the capacitance 494 and the transformer 476.

It will be apparent to those skilled in the art that the systems described in the foregoing pages may take numerous other forms not shown herein which are within the scope of the present invention and that embodiments of the present invention are accordingly not limited to the use of any particular element or combination of elements shown by way of illustration herein.

What is claimed is:

1. A radiant energy system comprising in combination a main station, a plurality of satellite stations, means at said main station for generating a frequency modulated carrier wave, means in energy transfer relation with said generating means for radiating said carrier wave in a directional beam, driving means coupled to said radiating means for causing said beam to repeatedly scan an area which includes said satellite stations, means connected to said driving means for controlling said driving means to fix the orientation of said beam in the direction of a selected satellite station, and means at said selected satellite station and at said central station for utilizing said frequency modulated carrier beam for the two-way transmission of intelligence, said means including an energy reflecting and absorbing circuit tuned to frequencies within the frequency band of said carrier wave and responsive to impressed modulating signals to vary the reflection of carrier wave energy therefrom.

2. A radiant energy system comprising in combination a main station, a plurality of secondary stations, means at said main station for generating and radiating a directed beam of frequency modulated carrier waves, driving means coupled to said generating and radiating means for causing said beam to repeatedly scan an area which includes said secondary stations, means at said secondary stations for reflecting and absorbing components of said beam, modulating means at said secondary stations connected to said reflecting and absorbing means for controlling the reflection of beam energy by said last-named means, calling means at said secondary stations in energy transfer relation with said modulating means for impressing a calling signal on the reflected component of said beam, detecting means at said main station responsive to the reflected component of said beam, means connected to said detecting means and responsive to said calling signal for controlling said driving means to fix the orientation of said frequency-modulated beam in the direction of said calling secondary station, means connected to said generating and radiating means at said main station for modulating said frequency modulated radiated beam in accordance with speech signals, speech receiving means connected to said reflecting and absorbing means at said secondary stations, speech transmitting means connected to the modulated means at said secondary stations, speech receiving means connected to the detecting means at said main station, and calling means in energy transfer relation with the modulating means at said main station for impressing a calling signal on said frequency modulated radiated beam.

3. A system in accordance with claim 2 in which said transmitted carrier beam is frequency modulated in accordance with a repetitive saw-tooth cycle, and wherein said detecting means is connected to said generating means to receive a component of transmitted energy, and wherein said detecting means comprises means for detecting the intermediate frequency wave derived from beating the reflected component of said beam with a component of transmitted carrier energy.

4. A system in accordance with claim 3 in which said speech receiving means at said central station comprise a plurality of units corresponding to satellite stations at different distances, and each tuned to a different band of intermediate frequencies.

5. A radiant energy system comprising in combination a main station, a plurality of satellite stations, means at said main station for generating and radiating a directed beam of carrier waves, driving means coupled to said generating and radiating means for causing said beam to repeatedly scan an area which includes said satellite stations, means connected to said driving means for controlling said driving means to fix the orientation of said beam in the direction of a selected satellite station, and means at said selected satellite station for utilizing said carrier beam for the two-way transmission of intelligence, said means including an energy reflecting and absorbing circuit responsive to impressed modulating signals to vary the reflection of carrier wave energy therefrom.

6. A radiant energy system comprising in combination a main station, a plurality of secondary stations, means at said main station for generating a carrier wave, means in energy transfer relation with said generating means for radiating said carrier wave in a directional beam, driving means coupled to said radiating means for causing said beam to repeatedly scan an area which includes said secondary stations, means at said secondary stations for reflecting and absorbing a component of said beam, modulating means at said secondary stations connected to said reflecting and absorbing means for controlling the components of the energy of said beam which are respectively reflected and absorbed, calling means at said secondary stations in energy transfer relation with said modulating means for impressing a calling signal on the reflected component of said beam, detecting means at said main station responsive to the reflected component of said beam, means connected to said detecting means and responsive to said calling signal for controlling said driving means to fix the orientation of said beam in the direction of said calling secondary station, means connected to said generating and radiating means at said main station for modulating said radiated beam in accordance with speech signals, speech receiving means connected to said reflecting and absorbing means at said secondary stations, speech transmitting means connected to the modulating means at said secondary stations, speech receiving means connected to the detecting means at said main station, and calling means in energy transfer relation with the modulating means at said main station for impressing a calling signal on said radiated beam.

7. A system in accordance with claim 6 in which the means at the secondary station for reflecting and absorbing components of said carrier beam comprise a directional antenna, a tuned circuit connected to said antenna, and means comprising a varistor coupled to said tuned circuit to present a varied impedance to the energy in said tuned circuit.

8. A system in accordance with claim 7 in which the means at the secondary stations for reflecting and absorbing a component of said carrier beam comprises a directional antenna having a wave guide feed, and a crystal rectifier disposed in said wave guide and responsive to signal currents to present a varied impedance to the energy in said wave guide.

9. A radiant energy system comprising in combination a central station which includes a source of carrier waves, a receiver responsive to receive said carrier waves, an antenna constructed to radiate said carrier waves in a directional beam, means for connecting said source and said receiver to said antenna, driving means mechanically coupled to said antenna to cause said beam to repeatedly scan a predetermined area, a modulating circuit connected to said carrier wave source, said modulating circuit including speech transmitting means and a source of calling signal current, a detecting circuit connected to said receiver, said detecting circuit including speech receiving means and calling signal responsive means, said calling signal responsive means connected to means to control the operation of said antenna driving means, a plurality of secondary stations positioned in the scanning path of the beam radiated by said central station, each of said secondary stations including a directional antenna responsive to said beam, energy reflecting and absorbing means connected to said antenna, controlling means connected to said reflecting and absorbing means to control the reflection and absorption of energy therefrom, speech transmitting and receiving means, a source of calling signal current, a calling signal annunciator, means connected to said controlling means and responsive to a calling signal from said central station for actuating said signal annunciator and for connecting said calling signal source to said controlling means, and switching means for disconnecting said calling signal source from said controlling means and for connecting said speech transmitting and receiving means in its stead.

10. In a radiant energy system, a satellite station comprising in combination a directional antenna, a tuned circuit responsive to reflect and absorb carrier wave energy received by said antenna, modulating means coupled to said tuned circuit for varying the amounts of carrier wave energy reflected and absorbed thereby in accordance with impressed signal currents, a source of calling signal current, means responsive to a calling signal from a remote point to connect said calling signal source to said modulating means, intelligence transmitting and receiving means, and switching means for disconnecting said calling signal source from said modulating means and for connecting said intelligence transmitting and receiving means in its stead.

11. In a radiant energy telephone system, a satellite station, comprising in combination a directional antenna, a wave guide responsive to reflect and absorb carrier wave energy received by said antenna, modulating and detecting means disposed in said wave guide for varying the amounts of carrier wave energy reflected and absorbed by said wave guide in accordance with impressed signals, a source of calling signal current, speech transmitting and receiving means, and means for connecting said source and said transmitting and receiving means to said modulating and detecting means.

12. In a radiant energy telephone system comprising in combination a main station and a plurality of secondary stations, said main station including means for generating and radiating a beam of carrier waves, and said secondary stations including means for modulating and reflecting the carrier wave beam from said main station, the improvement comprising in combination driving means connected to said generating and radiating means at said main station for causing said beam to repeatedly scan an area including said secondary stations, means connected to said modulating means at said secondary stations for impressing a calling signal on said reflected beam, calling signal receiving means at said central station, and means operative on said driving means at said main station for fixing said beam in the direction of a calling secondary station.

13. A system in accordance with claim 12 in which said means operative on said driving means is connected to said calling signal receiving means and operates in response to said calling signal.

14. A system in accordance with claim 12 which includes a calling annunciator, said annunciator connected to said calling signal receiving means and operative in response to said calling signal to notify the central station operator of an incoming call.

15. A telephone system comprising in combination, a central station and a plurality of satellite stations, radio transmitting and receiving means at said central station, means connected to said transmitting means to propagate a directional beam of radio frequency carrier waves, means to cause said beam to repeatedly scan through a predetermined arc, radio reflecting means at each of said satellite stations positioned to lie in the path of said scanning beam, means responsive to a signal from a particular one of said satellite stations for halting said scanning motion and directing said beam toward said particular satellite station, and means connected to said radio reflecting means for modulating said reflected carrier waves in accordance with desired signal currents whereby said signal modulated carrier waves are reflected back to said central station and received by said radio receiving means.

16. A radiant energy system for the transmission of intelligence comprising in combination a central station and a plurality of satellite stations, radio transmitting and receiving means at said central station, means connected to said transmitting means to propagate a directional beam of radio frequency carrier waves, driving means to cause said beam to repeatedly scan through a predetermined area which includes said satellite stations, means at each of said satellite stations for reflecting a portion of the energy of said beam back to said central station, means connected to said reflecting means for changing the polarization of the reflected beam with respect to the transmitted beam, means responsive to a reflected signal from a calling satellite station for halting said scanning motion and directing said beam toward said calling station, and means connected to said reflecting means and said polarization changing means for modulating said reflected carrier waves in accordance with desired signals whereby said signal modulated carrier waves are reflected back to said central station and received by said radio receiving means.

17. A communication system comprising in combination a central station and a plurality of satellite stations, a generator of carrier wave oscillations at said central station, means comprising a circuit connected to said generator for varying the frequency of said oscillations through a substantially repetitive saw-tooth cycle, means at said central station responsive to said frequency varied oscillations to radiate a beam of energy in the direction of a selected one of said satellite stations, means at said selected satellite station for modulating the energy of said beam in accordance with impressed signals and redirecting said modulated beam back to said central station, receiving means at said central station disposed to receive the signal modulated beam from said selected satellite station, means at said central station comprising a mixing circuit in energy transfer relation with said generator and said receiving means for combining the oscillations of said received beam with a component of oscillations from said generator, a plurality of beat detecting means selectively responsive to the different beat frequency output currents from said mixing circuit, a plurality of indicating means respectively connected to said different beat-frequency detecting means for indicating satellite stations at respectively different distances, and a plurality of speech receiving means respectively connected to said different beat detecting means.

SLOAN D. ROBERTSON.

References Cited in the file of this patent

UNITED STATES PATENTS

| Number | Name | Date |
|---|---|---|
| 2,061,699 | Fox | Nov. 24, 1936 |
| 2,129,332 | Mastine | Sept. 6, 1938 |
| 2,152,329 | Schussler | Mar. 28, 1939 |
| 2,193,102 | Koch | Mar. 12, 1940 |
| 2,206,896 | Higgins et al. | July 9, 1940 |
| 2,234,244 | Gossel | Mar. 11, 1941 |
| 2,243,523 | Davis | May 27, 1941 |
| 2,270,899 | Rodex | Jan. 27, 1942 |
| 2,272,839 | Hammond | Feb. 10, 1942 |
| 2,311,435 | Gerhard | Feb. 16, 1943 |
| 2,401,759 | Hersey | June 11, 1946 |
| 2,427,215 | Kohn | Sept. 9, 1947 |
| 2,446,024 | Porter et al. | July 27, 1948 |
| 2,448,055 | Silver et al. | Aug. 31, 1948 |
| 2,461,005 | Southworth | Feb. 8, 1949 |
| 2,461,646 | Lewis | Feb. 15, 1949 |
| 2,467,299 | Espenschied | Apr. 12, 1949 |
| 2,475,127 | Carlson | July 5, 1949 |
| 2,475,474 | Bruch et al. | July 5, 1949 |
| 2,479,701 | Ress | Aug. 23, 1949 |
| 2,607,004 | Harris | Aug. 12, 1952 |

FOREIGN PATENTS

| Number | Country | Date |
|---|---|---|
| 557,563 | Great Britain | Nov. 25, 1943 |